Figure 1:
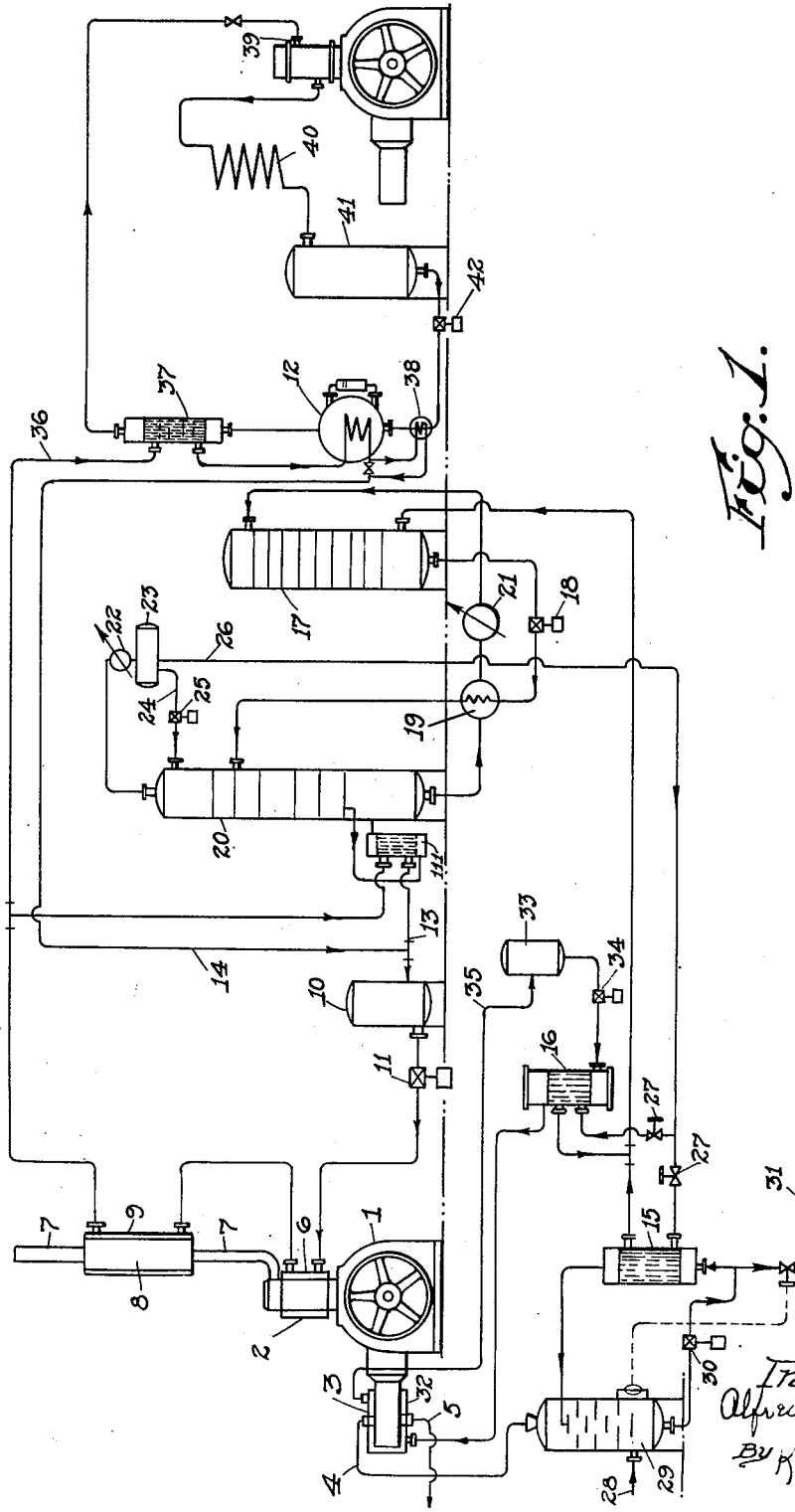

April 10, 1951  A. S. WOLFNER  2,548,508
THERMAL SYSTEM
Filed March 5, 1946  2 Sheets-Sheet 2

Inventor:
Alfred S. Wolfner
By Kenway & Witter
Attorney

UNITED STATES PATENT OFFICE 2,548,508

THERMAL SYSTEM

Alfred S. Wolfner, Boston, Mass.

Application March 5, 1946, Serial No. 652,184

4 Claims. (Cl. 230—211)

My invention relates to gas compressor systems and comprises, in one aspect, a novel method for improving the performance and lowering the fuel consumption of internal combustion engines forming elements of the system.

The invention comprises essentially the recovery of waste heat from internal combustion engines, which normally is dissipated at the rate of 200 to 300% of the useful engine work produced, and its utilization for the generation of vapors from liquid refrigerants such as ammonia, sulphur dioxide, etc.

These vapors are utilized for the production of artificial cooling or of mechanical power in accordance with the description given herein.

In the case of internal combustion engines the artificial cooling produced from waste heat may be employed for lowering the intake temperature of the air of combustion required for operating the engines, while according to a second method described herein mechanical power is produced by the expansion of vapors from a high temperature and pressure level, corresponding to the temperature level of the waste heat, to a lower pressure level corresponding to the temperature of condensation which can be realized under given atmospheric conditions.

It will be clear from this specification that the term "internal combustion engine" is meant to cover all kinds of reciprocating type motors of the constant volume combustion and constant pressure combustion kind as well as gas turbine plants. It is intended also to apply to steam boilers designed for combustion under pressure using compressors for charging combustion air and expansion engines for recovering mechanical energy from the flue gas expanding to atmospheric pressure.

In the case of compressors driven by internal combustion engines the waste heat recovered from the driving engine generates refrigerant vapors which in turn produce artificial cold which is used to cool below atmospheric temperature the compressor intake charge as well as the jacket fluid which is circulated around the compression cylinders, in order to lower horsepower requirements by means of polytropic instead of adiabatic compression. The artificial cold can also be applied to cool and liquefy the compressor output.

The artificial cold is preferably produced from the waste heat by means of the continuous absorption method using ammonia as a refrigeration fluid. A concentrated ammonia vapor, which in turn is rectified and condensed, is generated by heating an aqueous ammonia solution. The liquid ammonia is allowed to vaporize under lower pressure to produce the desired refrigeration effect. The resulting ammonia vapors are absorbed by a lean aqueous ammonia solution. The rich solution is then pumped back to the vapor generator where it is separated into a weak aqueous solution which is returned to the absorber and into concentrated ammonia liquid, the evaporation of which furnishes the refrigeration effect.

Since the work of compression is a direct function of the intake temperature expressed in terms of absolute temperature, considerable savings in power can be effected by applying artificial cold to the lowering of the intake temperature of air of combustion used in internal combustion engines as well as by applying this refrigeration to the gaseous charge of compressor plants. Incidental to the temperature reduction is a partial elimination of water vapor and of other condensable constituents from air and gas, which contributes towards a further reduction of the volumes of gas to be compressed as well as to improved performance, since corrosion difficulties, drip formations, etc. can be reduced considerably.

The fluids employed for the purpose of producing artificial cold and for the expander engine circuit may be different in nature or composition, however both derive their heat from the waste heat recovered from the internal combustion engine. A preferred method of recovering this waste heat consists in the circulation of a relatively non-volatile suitable heat transmission liquid such as glycol or diphenyl which can be heated to the desired operating temperature without inconvenience. Instead of circulating water at temperatures below 200° F. through the cooling jackets of the internal combustion engine, the use of high temperature cooling liquids permits engine cooling at temperatures above 200° F. and up to 350° F. and lends itself, alone or in combination with heat recovery from the engine exhaust, to the generation of artificial cold and of mechanical power in the manner indicated. Cooling the engine cylinders at such elevated temperatures has already been practiced on certain types of engines for different purposes and without providing for the useful utilization of the thermal energy as proposed in this specification.

Operating the internal combustion engine with cylinder cooling at elevated temperature will incidentally improve engine efficiency since the heat transfer from the cylinder walls will be reduced during the compression stroke resulting in the reduction of heat losses and in an increase of expansion work to a greater degree than the increase of the compression work caused by diminished heat loss through the cylinder walls.

Figure 2:
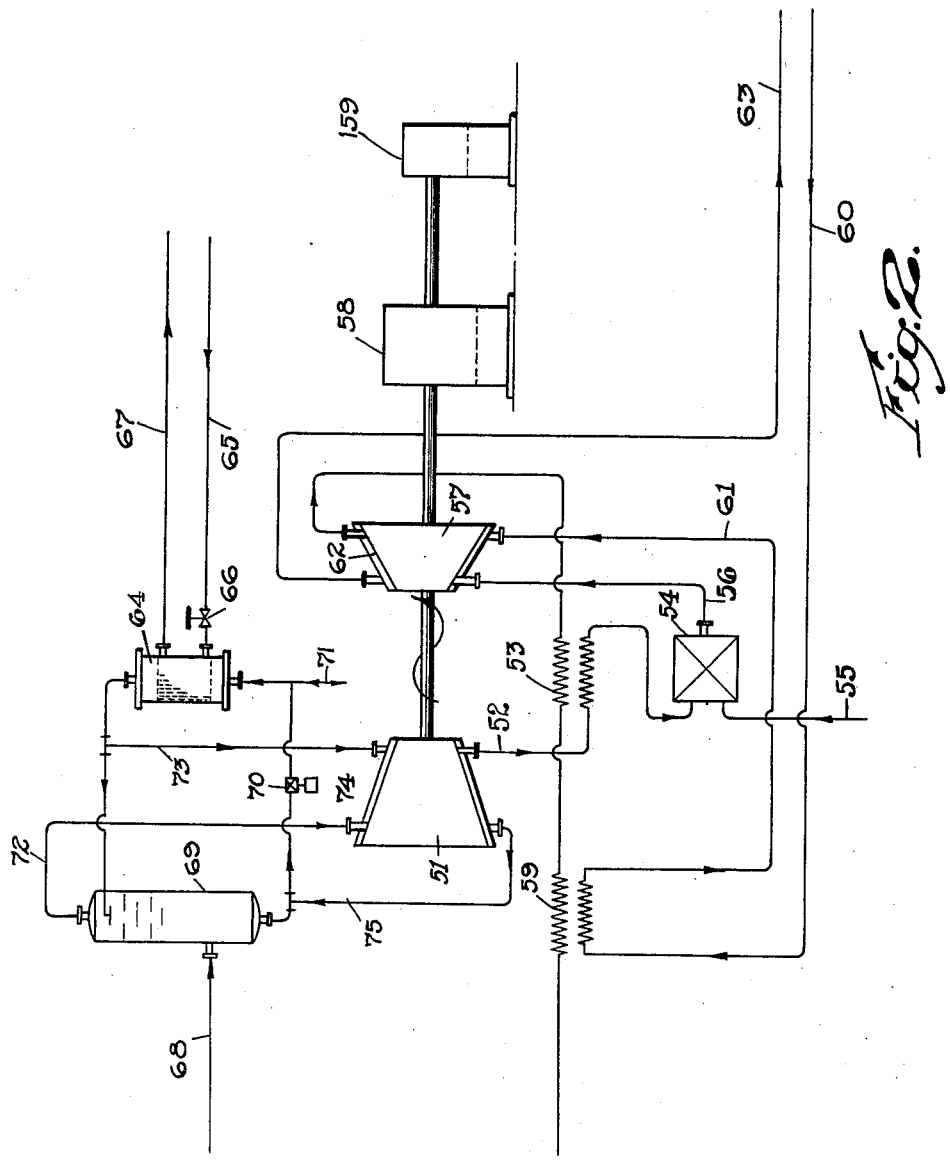

Further objects and features of my invention will be more readily understood and appreciated from the following detailed description of a preferred embodiment thereof selected for purposes of illustration and shown in the accompanying drawings, in which:

Figs. 1 and 2 are schematic diagrams showing thermal systems laid out in accordance with my invention.

A compressor engine 1 comprises several internal combustion type power cylinders 2 which furnish the mechanical energy to drive several gas compressor cylinders 3 which receive gas through an intake line 4 and discharge it under increased pressure through line 5. The power cylinders 2 are equipped with cooling jackets 6, and their combustion gases are exhausted to the atmosphere through a line 7 and an exhaust muffler 8 equipped for heat exchange by means of a jacket 9. A suitable heat transfer (cooling) fluid is circulated in series through jackets 6 and 9 by means of a circulating pump 11 which takes cool fluid from a buffer tank 10. Waste heat is picked up from the internal combustion engine and the warm fluid is directed to heat transfer units such as 12, 37, 38 and 111 in which the heat absorbed from the power drive is transmitted to the working fluid of the absorption refrigeration system. The cool fluid is returned to buffer tank 10 by means of return flow lines 13 and 14 and heat is picked up in the closed circuit when it is pumped again through the engine and muffler jackets 6 and 9. This fluid will be circulated preferably at 200° to 350° F. and at a relatively high rate, limiting the temperature variations during circulation to a moderate value of approximately 10° to 50° F.

The equipment for producing artificial cold is of the continuous absorption type employing ammonia as refrigerant. Cold is produced by the evaporation of liquid ammonia under low pressure in the evaporators 15 and 16. The refrigerant vapors are then dissolved in weak ammonia solution in an absorber 17 and the resulting liquid is pumped by the strong solution pump 18 through heat exchanger 19 into the ammonia vapor generator 20 to the bottom of which heat is applied through reboiler 111. From the bottom of the generator 20 a weak aqua ammonia solution is withdrawn which flows through a heat exchanger 19 and a cooler 21 to the absorber 17. From the top of vapor generator column 20 a highly concentrated ammonia vapor passes into a vapor condenser 22 where it is liquefied and from there to a receiver drum 23. Part of the liquid ammonia produced is returned to the column as reflux via a line 24 and a pump 25 in order to assure the concentration of the overhead vapors by rectification. The net product of liquid ammonia is withdrawn through a line 26 and after passage through expansion valves 27 is allowed to vaporize in evaporators 15 and 16 where refrigeration is produced. All the heat required for operating this cycle is obtained from the jackets 6 and 9 of the internal combustion engine driving the compressor cylinders 3 by means of circulating the heat transfer fluid.

The artificial cold produced in the ammonia evaporator 15 serves for cooling the incoming compressor charge to a low temperature. The intake gas arrives through line 28 and flows upward through a spray cooler 29 where it is brought into intimate contact with a spray of cold wash fluid which can be either water or a brine solution or another suitable fluid, according to cooling temperature and compressor charge. The gas temperature is lowered nearly to the temperature of the incoming spray liquid, and a large part of original water vapor content of the gas as well as other condensible constituents are precipitated. The spray fluid accumulating in the bottom section of the cooling drum 29 is picked up by a circulating pump 30 and cooled in evaporator 15 before its return to the top section of the spray cooler. Through line 31 any excess of the spray liquid is withdrawn. By applying artificial cold to the compressor charge in the manner described or in any other suitable manner, the actual temperature of the gas and the intake volume are reduced and the work of compression decreased.

The part of the artificial cold which is produced in ammonia evaporator 16 serves for the dissipation of the heat of compression which is removed from the compressor cylinders through the jackets 32. Instead of circulating water at about atmospheric temperature as is the case normally, the jacket of the compressor cylinders will, according to this invention, be cooled with water, brine solution or other suitable fluid, the temperature of which has been lowered to less than atmospheric temperature by refrigeration produced from the waste heat of the driven engine. The compressor jacket fluid accumulates in a drum 33 and is circulated through a pump 34 to the ammonia evaporator 16 where it is cooled and into compressor cylinder jackets 32 where it absorbs heat. It returns through line 35 to the drum 33. The use of low temperature jacket cooling results in greater heat removal from the compressor cylinders and in reduced power consumption since the work of gas compression takes place under improved conditions more closely approaching isothermic compression than would be the case when cooling with water at ordinary, atmospheric temperature.

A further utilization of artificial refrigeration produced from the waste heat of internal combustion engines resides in the cooling below the atmospheric temperature of the air of combustion which is taken in by these engines. In most internal combustion engines this air is compressed in the power cylinder proper but in certain cases the combustion air is partly or completely compressed in separate blower or compressor machinery.

By applying artificial cooling at the point of intake to this air of combustion its density is increased and water vapor is eliminated to a great degree. In consequence of it the weight of air, and of oxygen corresponding to a given engine intake volume is increased and greater power output can be obtained. The mechanical efficiency of the power drive will be improved too since the negative work of compressing the combustion air is reduced by virtue of lowered intake temperature. Any decrease of this negative work will improve engine efficiency since the useful work produced in an internal combustion engine is substantially the difference between the gross power output resulting from the expansion of the combustion products to atmospheric pressure, and the work of bringing the air of combustion from atmospheric to engine compression pressure.

In Figure 2 a schematic flow chart of such an arrangement is exemplified on a gas turbine power plant.

51 denotes a turbo-type air compressor which delivers combustion air through a line 52 and a heat exchanger 53 into the combustion chamber 54. Through a line 55 gaseous or liquid fuel is introduced continuously into the combustion chamber, and hot combustion gases under constant pressure are conducted through a line 56 into the turbine 57 where, discharging and expanding through nozzles and buckets, they furnish the mechanical energy for driving the air compressor 51 as well as a net power output which is taken up by an electric generator 58. On the same shaft interconnecting 51, 57 and 58 is a starting motor 159. The exhaust gases from the turbine 57 flow to air preheater 53 and from there to a heat exchanger 59 and to the atmosphere. A suitable heat transfer fluid is continuously circulated through lines 60 and 61 to the heat exchanger 59 and to a turbine cooling jacket 62, and waste heat is picked up from engine exhaust and from cooling jacket of the hot gas turbine. This fluid, under increased temperature, flows through a line 63 to an absorption type refrigeration plant where heat is transmitted to the refrigerant. The refrigeration equipment is not shown in Fig. 2 since a typical flow description of such a plant is furnished elsewhere in this specification. The cooled heat transfer fluid is returned, in close continuous circuit, to heat exchanger 59 and the gas turbine jacket 62 to pick up additional waste heat from the gas turbine. The artificial cold produced in this manner is used to lower the intake temperature of the combustion air by evaporating liquid ammonia under reduced pressure in an evaporator 64. A line 65 with pressure reducing valve 66 serves for supplying liquefied refrigerant from the absorption plant to the evaporator, while a line 67 evacuates the ammonia vapors from the evaporator 64 to the absorber of the refrigeration unit.

Combustion air is taken in from the atmosphere through a line 68 and cooled to below atmospheric temperature in a spray cooler 69 by direct contact with a refrigerated spray liquid circulated from the bottom of the vessel 69 via a pump 70 to the refrigeration evaporator 64 and back again to the top of the spray cooler 69. Any excess or shortage of spray liquid is withdrawn or added through a line 71. The cooled combustion air or gas leaves the top of the spray cooler 69 and flows through the line 72 to the intake of air compressor 51.

In agreement with the proposed use of a compressor coolant of low temperature, part of the spray liquid in circulation is employed for jacket cooling of the air compressor 51. The refrigerated spray liquid thus flows also through a line 73 to a compressor cooling jacket 74, where heat of compression is absorbed, and back to circulating pump 70 and the refrigerant evaporator 64 through a line 75.

The production of mechanical energy from the waste heat recovered from the power drive of the compressor plant is exemplified as follows (Fig. 1):

Part of the heat transfer fluid which has circulated through the jackets 6 and 9 is directed through a line 36 to a vapor superheater 37 and then to the heating coils of a boiler 12 and of a preheater 38, where heat is transmitted. This fluid is returned at reduced temperature to the buffer tank 10 by means of a line 14 and from there recirculated to the internal combustion engine where waste heat is picked up again.

The heat thus transmitted is used for the generation of vapor under elevated pressure from suitable compounds normally used as refrigerant fluids. These vapors, after being superheated, are led into an expander engine 39 built and operating like a steam engine, or into a turbine, where the expansion of the vapor produces additional motive power which preferably is used for helping drive the main engine. The exhaust of the expander engine is liquefied in a condenser operating at substantially atmospheric temperature and is collected in a drum 41. A feed pump 42 takes this liquid through the preheater 38 into the boiler 12 where vapors are generated. These vapors are superheated in the superheater 37 and, if deemed necessary, also in a direct fired superheater (not shown). The vapors are then led again to the expander engine for producing mechanical power.

Any kind of suitable fluid may be used in this circuit, but preferably ammonia, Freon and other refrigerant fluids since they permit operation at elevated pressures within the limits of operation determined by the temperature of the available waste heat and the atmospheric temperature, which fix the pressure of exhaust and condensation. The vapor pressure of the power circuit working fluid should preferably be greater than atmospheric pressure at the lowest temperature (condensation) encountered, in order to avoid operation under vacuum and permit the use of equipment and piping of small dimensions.

Having thus disclosed my invention, what I claim as new and desire to secure by Letters Patent of the United States is—

1. A gas compressor system comprising an internal combustion engine having jacketed cylinders and a compressor driven by said engine and having jacketed cylinders and a gas intake line, a cooling circuit arranged to pass a cooling medium through the jackets of the engine, a second cooling circuit arranged to pass cooling medium through the jackets of the compressor cylinders, and a refrigeration circuit arranged in heat exchange relation with both of said cooling circuits and also in heat exchange relation with the gas intake line of the compressor for cooling the gas which is to be compressed independently of the engine cycle.

2. A gas compressor system comprising a jacketed internal combustion engine and a compressor driven by the said engine and having jacketed cylinders and a gas intake line, a cooling circuit connected to the jacket of the engine and compressor for passing a cooling fluid therethrough, and a refrigeration circuit arranged in heat exchange relation with the said cooling circuit and with the gas intake line of the compressor for cooling the gas which is to be compressed independently of the engine cycle.

3. A gas compressor system comprising a jacketed internal combustion engine and a jacketed compressor driven by the said engine and having a gas intake line, a cooling circuit arranged to pass cooling fluid at 200° to 350° F. through the jacket of the engine, a second cooling circuit arranged to pass cooling fluid at less than atmospheric temperature through the jacket of the compressor cylinders, and a refrigeration circuit arranged in heat exchange relation with both of said cooling circuits and also in heat exchange relation with the gas intake line of the compressor for cooling the intake gas independently of the engine cycle.

4. A gas compressor system comprising a jacketed internal combustion engine, a compressor driven thereby and having a gas intake line, a cooling circuit connected to the jacket of the engine and to the compressor for passing a cooling fluid therethrough, and a refrigeration circuit arranged in heat exchange relation with the said cooling circuit and including a spray cooler connected in the gas intake line for cooling the intake gas independently of the engine cycle.

ALFRED S. WOLFNER.

REFERENCES CITED

The following references are of record in the file of this patent:

UNITED STATES PATENTS

| Number | Name | Date |
|---|---|---|
| 1,230,617 | Still | June 19, 1917 |
| 1,669,530 | Miller | May 15, 1928 |
| 1,809,409 | Granger | June 9, 1931 |
| 2,009,067 | Mulholland | July 23, 1935 |
| 2,186,706 | Martinka | Jan. 9, 1940 |
| 2,192,367 | Prince | Mar. 5, 1940 |
| 2,249,882 | Buchanan | July 22, 1941 |
| 2,322,717 | Nettel | June 22, 1943 |
| 2,339,185 | Nettel | Jan. 11, 1944 |
| 2,362,714 | Nettel | Nov. 14, 1944 |
| 2,385,033 | Schwarz | Sept. 18, 1945 |

FOREIGN PATENTS

| Number | Country | Date |
|---|---|---|
| 453,513 | Germany | Dec. 8, 1927 |